(12) United States Patent
Polovin

(10) Patent No.: US 6,834,952 B2
(45) Date of Patent: Dec. 28, 2004

(54) EYEWEAR WITH DETACHABLE AND REPLACEABLE TEMPLES

(75) Inventor: Terrence Peter Polovin, Marrickville (AU)

(73) Assignee: Jonathan Sceats Eyewear Pty. Limited, Marrickville (AU)

( * ) Notice: Subject to any disclaimer, the term of this patent is extended or adjusted under 35 U.S.C. 154(b) by 0 days.

(21) Appl. No.: 10/654,259

(22) Filed: Sep. 3, 2003

(65) Prior Publication Data

US 2004/0160570 A1 Aug. 19, 2004

(30) Foreign Application Priority Data

Feb. 19, 2003 (AU) ........................................ 2003900731
Jul. 16, 2003 (AU) ........................................ 2003213488

(51) Int. Cl.[7] ................................................. G02C 5/14
(52) U.S. Cl. ........................ 351/116; 351/111; 351/119
(58) Field of Search ................................. 351/116, 115, 351/111, 119, 118, 153, 156, 157, 41, 158; 24/3.3

(56) References Cited

U.S. PATENT DOCUMENTS

| | | | |
|---|---|---|---|
| 5,007,728 A | | 4/1991 | Magorien |
| 5,594,511 A | * | 1/1997 | Lin .............................. 351/116 |
| 5,652,637 A | | 7/1997 | Marini |
| 5,936,701 A | | 8/1999 | Sartor |

FOREIGN PATENT DOCUMENTS

JP          117052       4/2001

* cited by examiner

Primary Examiner—Hung Xuan Dang
(74) Attorney, Agent, or Firm—Ladas & Parry LLP

(57) ABSTRACT

A pair of glasses (10) that includes a lens frame (11) supporting a pair of lenses (12). The frame (11) includes rearwardly extending temple mountings (13) to which there is releasably attached temples (14). The temples (14) are releasably attach to the mountings (13) by means of clip assemblies (15).

8 Claims, 4 Drawing Sheets

EYEWEAR WITH DETACHABLE AND REPLACEABLE TEMPLES

BACKGROUND OF THE INVENTION

Glasses include a frame with lenses. The frame also includes extensions to which the temples are pivotally attached. Typically, the temples are at least partly formed of plastics material and are colored.

Accordingly, if a user of the eyewear requires temples of different colors, several pieces of eyewear need to be purchased. Each piece of eyewear would have temples of a respective one of the desired colours. Clearly this is a disadvantage in respect of cost as the user needs to purchase several pieces of eyewear.

OBJECT OF THE INVENTION

It is the object of the present invention to overcome or substantially ameliorate the above disadvantages.

SUMMARY OF THE INVENTION

There is disclosed herein eyewear including a pair of removable temples and a lens frame with a pair of temple mountings each pivotally attached to the lens frame for pivoting movement about a pivot axis to provide for pivoting movement of the temples between a folded configuration located adjacent the lens frame and a use configuration projecting from the lens frame, each mounting having a frame clip portion providing a socket and a clip aperture, each temple having an end extremity also with a clip portion, the temple clip portion of each temple being configured to releasably engage within the socket of a respective one of the mountings to releasably secure each temple to the frame: and wherein each temple clip portion includes a bayonet having a resiliently deflectable pawl that engages within the aperture of the associated mounting and that is resiliently deflected about a deflection axis generally normal to the temple and generally normal to the associated pivot axis so that a user resiliently deforms the pawl to cause the pawl to retreat into the mounting to enable removal of the temple, with each frame clip portion including a slot extending to the associated aperture, and each pawl includes a projection to pass alone the associated slot to aid the user to manipulate the pawl to cause the retreat of the pawl to thereby enable withdrawal of the bayonet from within the socket.

Preferably, each bayonet is inserted in the associated socket by movement in a predetermined direction generally parallel to the temple, and generally normal to the associated deflection axis and pivot axis.

Preferably, each pawl has an abutment surface received within the associated aperture and to engage the associated frame clip portion to secure the temple to the lens frame, each abutment surface facing in a direction opposite to said predetermined direction.

Preferably, each abutment surface is removed from engagement with the associated frame clip portion when the pawl is retracted into the mounting.

Preferably, each projection has a width transverse of the temple, and each abutment surface has a width transverse of said temple, with each projection width being less than the width of the abutment surfaces.

Preferably, each temple includes a longitudinal ridge slidably received within the associated slot to aid in rigid attachment of the temples to the mountings.

Preferably, each frame clip portion is formed of metal and each temple clip portion is formed of resilient plastics material.

Preferably, each temple clip portion includes ramp surfaces to deflect the pawls to provide for insertion of the pawl thereof in the sockets.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
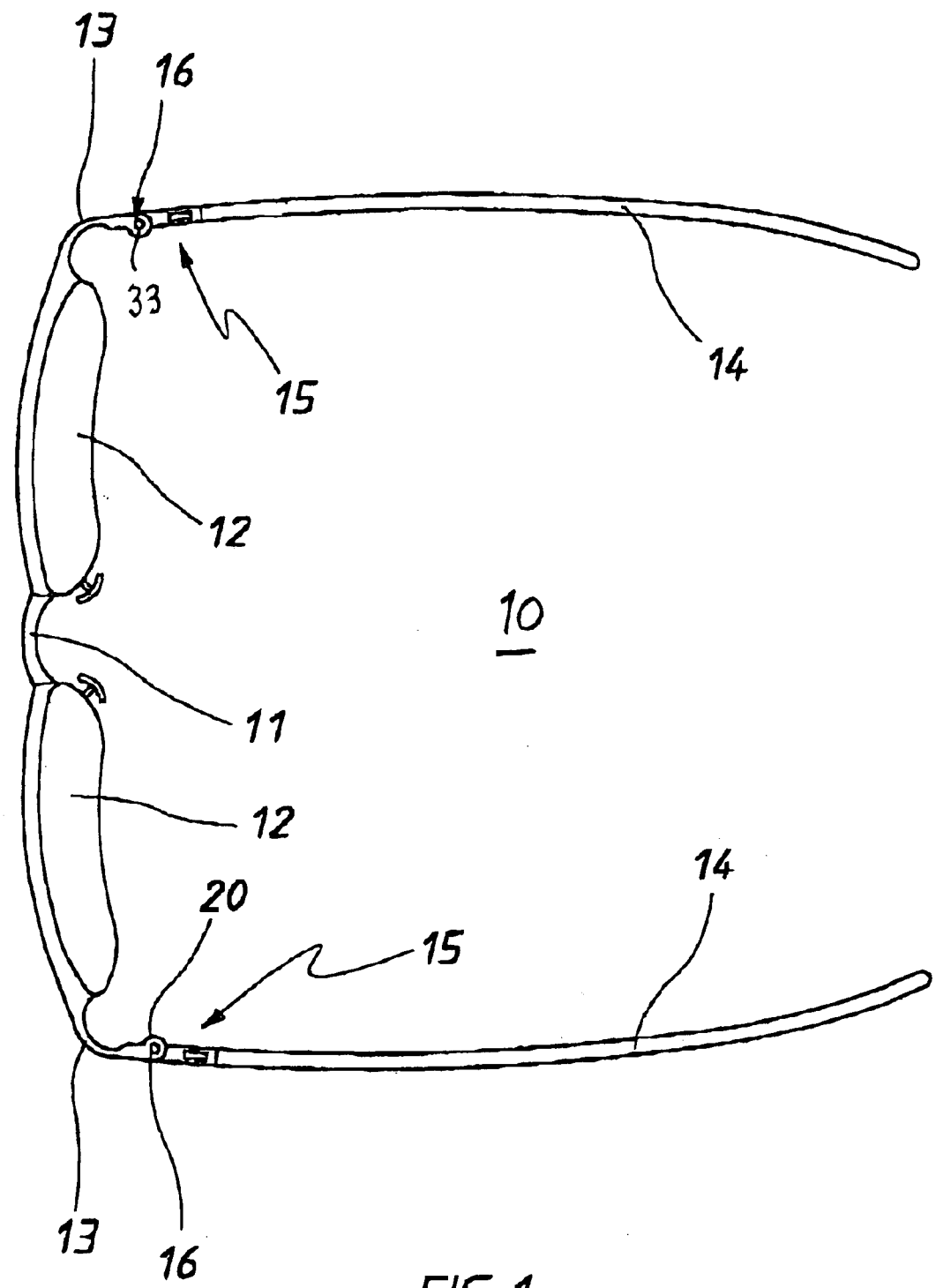
FIG. 1 is a schematic perspective view of a pair of glasses.

In FIGS. 1 to 4 of the accompanying drawings there is schematically depicted a pair of glasses 10. The glasses 10 include a lens frame 11 supporting a pair of lenses 12. The frame 11 includes rearwardly projecting extensions (temple mounting) 13 to which the temples 14 are releasably attached. More particularly, the temples 14 are releasably attached to the extensions 13 by means of a clip assembly 15, the clip assembly 15 including clip portions 17 and 21.

The temples 14 are also attached to the frame 11 by means of a pivot or hinge 16 providing a pivot axis 66.

Each pivot 16 includes a respective first (frame) clip portion 17 providing part of the hinge 16 by way of a flange 18 having an aperture 19. The flange 18 is located between a pair of spaced eyelets 20 of the projection 13, with a pivot pin 33 (typically a threaded fastener) passing through the eyelets 20 and aperture 19 to threadably engage the lower eyelet 20 that is threaded. Accordingly, the temples 14 pivot about the axis 66 between a folded configuration and a use configuration (as illustrated).

In this embodiment, the first clip portion 17 includes a socket member 22 having an upwardly facing aperture 23. The second clip portion 21 includes a bayonet 24 having a resilient pawl 25, with the bayonet 24 being shaped to be received within the socket member 22 by movement in the direction of the arrow 65 extending generally parallel to the major direction of extension of the temples 14. More particularly, the pawl 25 is resiliently urged to project upwardly through the aperture 23 so that the clip portion 21 is retained fixed to the clip portion 17.

Figure 3:
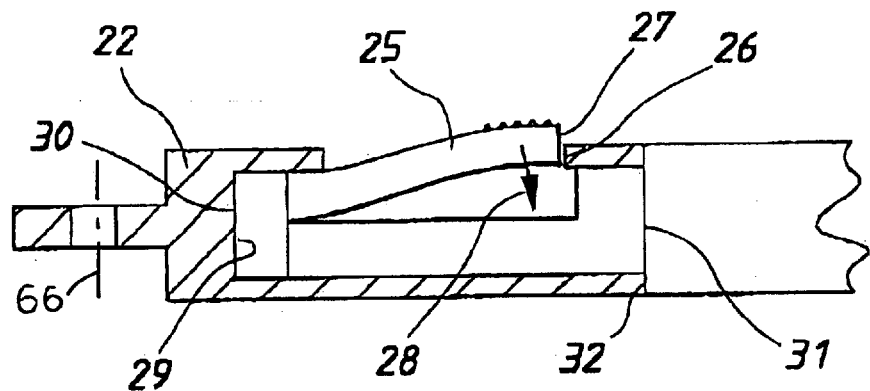
FIG. 3 is a schematic sectioned side elevation of the temple attachment of FIG. 2.
Figure 4:
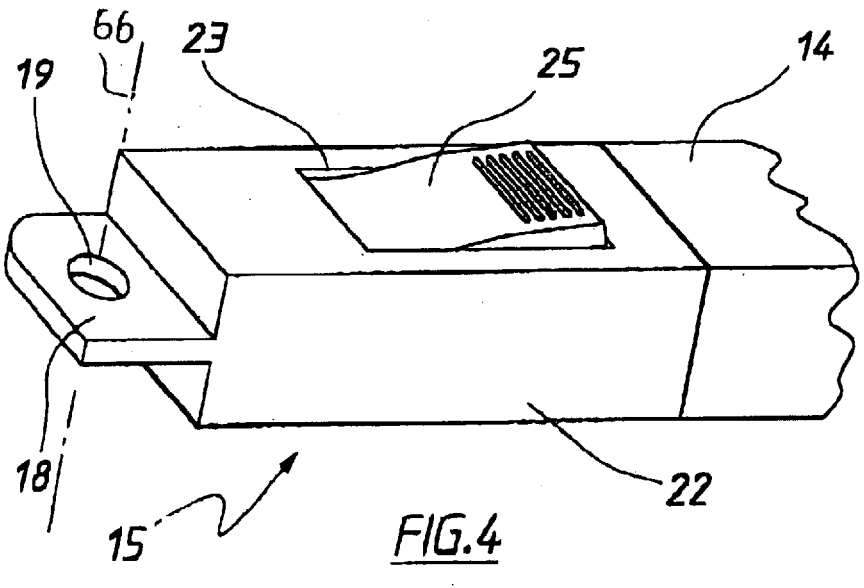
FIG. 4 is a schematic perspective view of the temple attachment of FIGS. 2 and 3.

As is best seen in FIG. 3, the socket 22 provides an abutment surface 26, bordering the aperture 23, that is engaged by an end surface 27 of the resilient pawl 25. Engagement of the surfaces 26 and 27 prevents removal of the temple 14. However, a user resiliently deflects the pawl 25 downwardly to cause it to pivot about an axis 66 generally normal to the temple 14 in the direction of the arrow 28 to enable the bayonet 24 to be withdrawn from within the socket 22. The axis 67 of the arrow 28 is normal to the axis 66.

The bayonet 24 has a leading surface 29 engages an internal surface of the socket 22 to aid in ensuring the temple 14 is inhibited from moving relative to the clip portion 17. In this regard, the temple portion 14 has an end surface 31 that abuts the surface 32 of the fist clip portion 17.

In use of the above described temples 14 a user merely buys a single frame 11 with its associated lenses 12 and a variety of temples 14 of different colors. A user then picks the temples 14 of the desired color and attaches them to the frame 11 by means of the clip portions 17 and 21.

In a further preferred form, the clip portions 17 and 21 are interchanged so that the clip portions 17 is part of the temple 14 and the clip portion 21 part of the frame 11.

Figure 2:
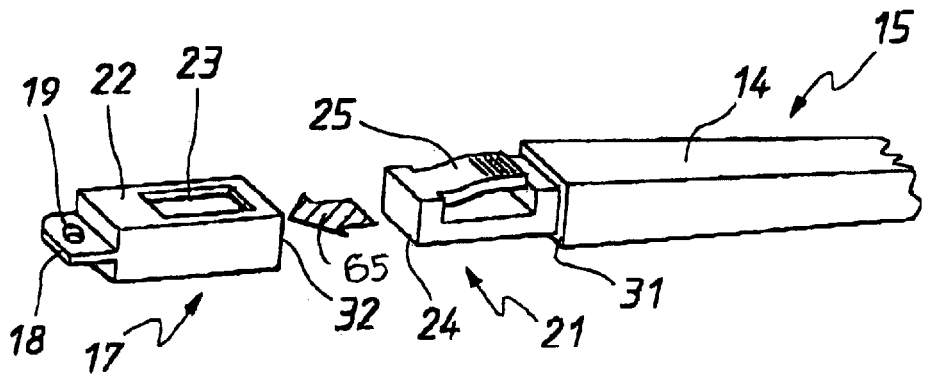
FIG. 2 is a schematic perspective view of a temple attachment of the glasses of FIG. 1.

Preferably, the clip portion 17 of FIG. 2 is formed of metal and the clip portion 21 formed of resilient plastics material.

Figure 5:
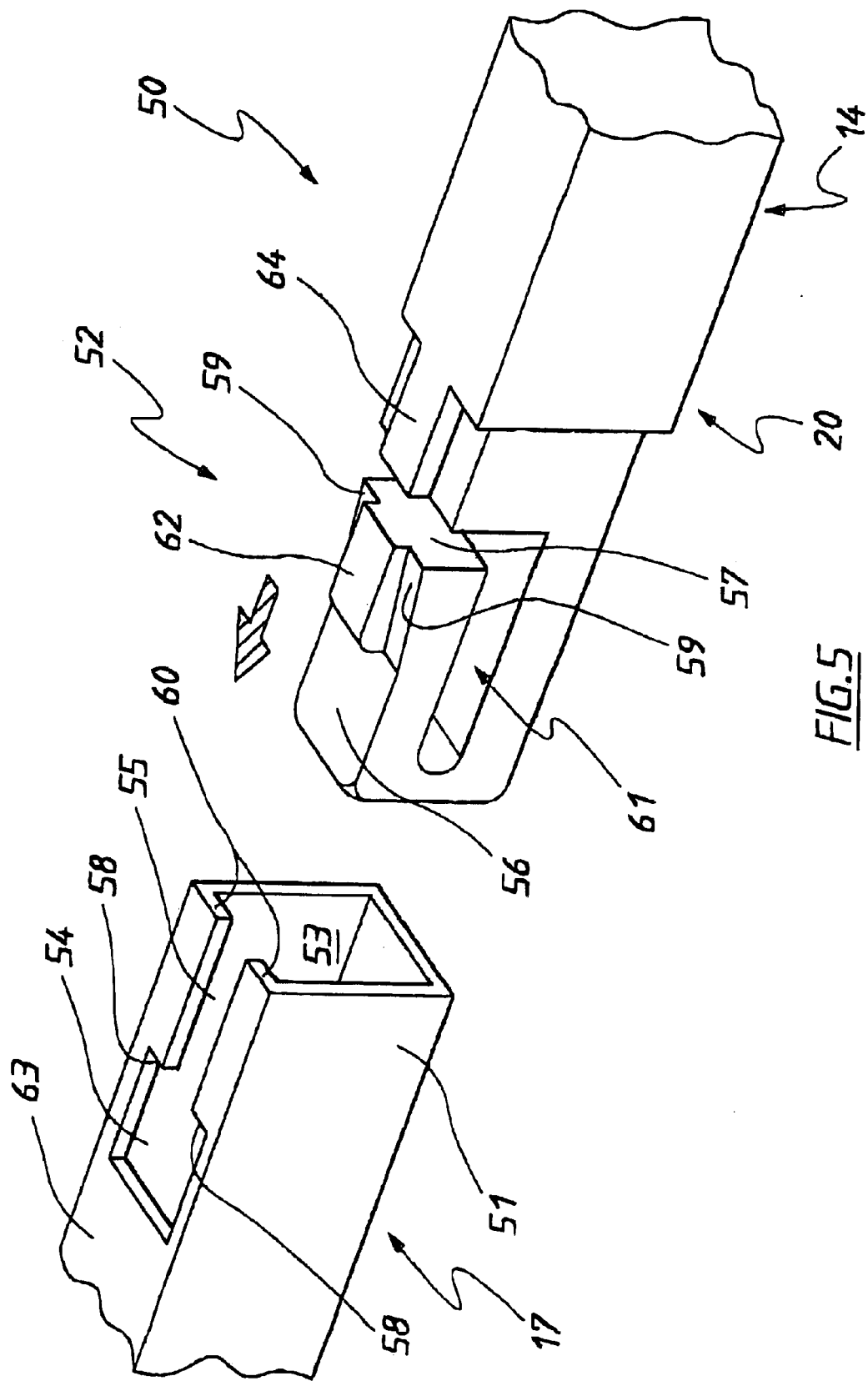
FIG. 5 is a schematic parts exploded isometric view of an alternative temple attachment to that described with reference to FIGS. 2 to 4.
Figure 6:
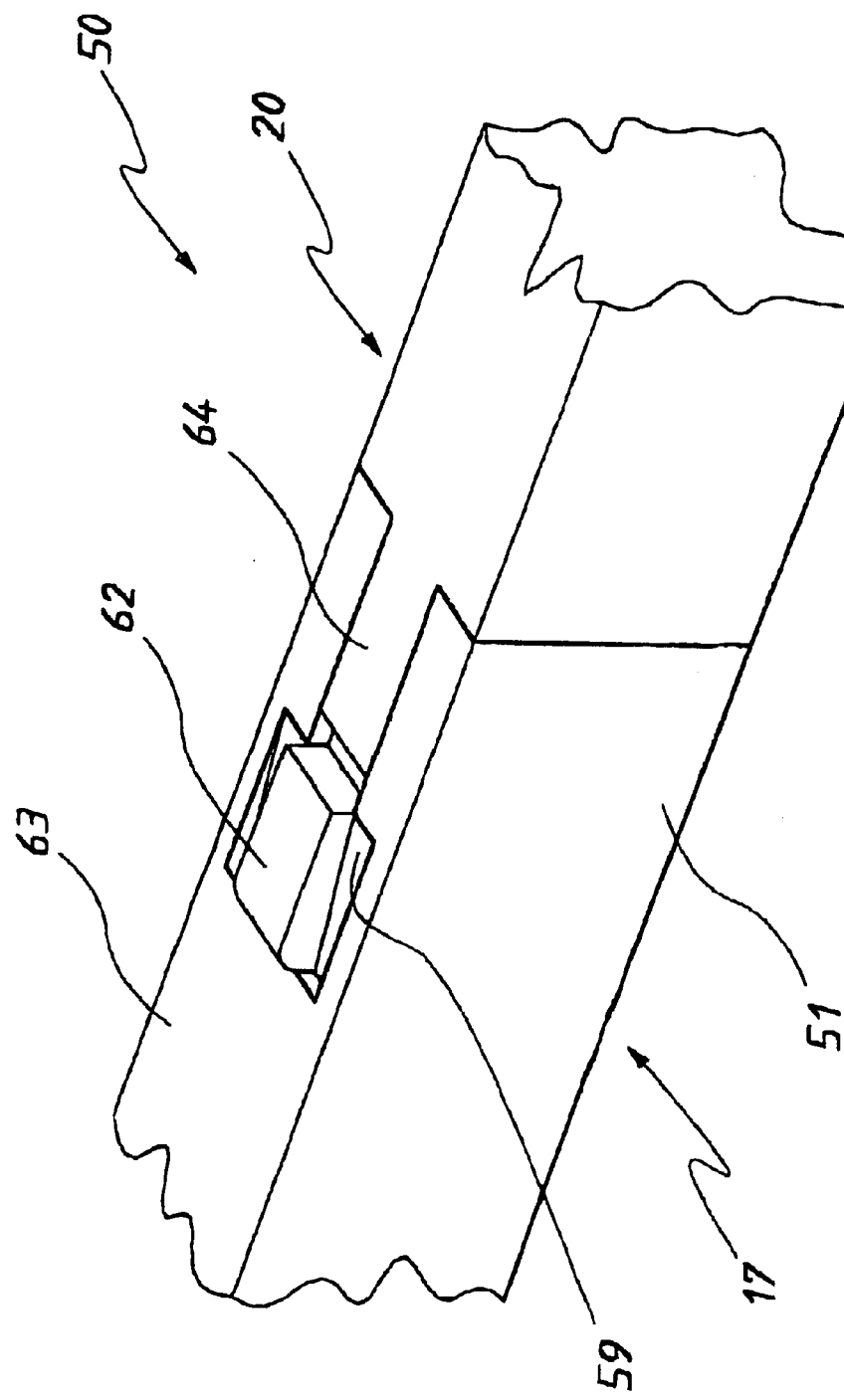
FIG. 6 is a schematic isometric view of the temple attachment of FIG. 5.

In FIGS. 5 and 6 there is schematically depicted a clip assembly 50 that is an alternative to the clip assembly 15 of FIG. 1 to 4. Tho clip assembly 50 includes a first clip portion 17 that provides a socket body 51 to receive a bayonet 52 of a second clip portion 20. The socket body 51 is hollow so as to provide a passage 53 that communicates with an aperture 54. Extending from the aperture 54 is a slot 55 that also communicates the passage 53. The body 51 would have fixed to it a flange such as the flange 18 of FIGS. 1 to 4. Typically the body 51 would be formed of metal, with the passage 53 being square or rectangular in transverse cross-section.

The second clip portion 20 would be is formed of resilient plastics material, with the bayonet 52 providing a resiliently deflectable pawl 56. The pawl 56 pivots about an axis generally normal to the temple 14. The pawl 56 has an end abutment surface 57 that engages step surfaces 58 bordering the aperture 54. This retains the clip portion 20 attached to the clip portion 17 when the bayonet 52 is inserted in the passage 53. When inserting the bayonet 52 ramp surfaces 59 engage flanges 60 of the body 51 to resiliently deflect the pawl 56 to a retracted position so that the bayonet 52 can enter the passage 53. When the end portion 61 of the pawl 56 is aligned with the aperture 54, the end portion 61 moves to an extended position so that the surface 25 abuts the surfaces 26. When the clip portion 20 is to be detached from the clip portion 17, the user engages the projection 62 with their finger and depresses the pawl 56 so that the surface 57 is no longer aligned with the surfaces 58, that to cause the pawl to retreat into the mounting 17. The bayonet 52 can then be removed from within the passage 53. Movement of the pawl 56 with respect to the passage 53 is accommodated by movement of the projection 62 along the slot 55. The surface 57 is wider than the projection 62 and extends transverse of the temple 14. within the passage 57. Movement of the pawl 56 with respect to the passage 53 is accommodated by movement of the projection 62 along the slot 55.

In respect of the clip assembly 50 it should be appreciated the projection 62 projects above the top surface 63 of the body 51 so that it is easily engaged and depressed by a user's finger. To provide a secure rigid attachment between the clip portions 17 and 20, he clip portion 20 has a ridge 64 that slidably engages within the slot 55.

What is claimed is:

1. Eyewear comprising a pair of removable temples and a lens frame with a pair of temple mountings each pivotally attached to the lens frame for pivoting movement about a pivot axis to provide for pivoting movement of the temples between a folded configuration located adjacent to the lens frame and a use configuration projecting from the lens frame, each mounting having a frame clip portion providing a socket and a clip aperture, each temple having an end extremity also with a clip portion, the temple clip portion of each temple being configured to releasably engage within the socket of a respective one of the mountings to releasably secure each temple to the frame: and wherein each temple clip portion includes a bayonet having a resiliently deflectable pawl that engages within the aperture of the associated mounting and is resiliently deflected about a deflection axis generally normal to the temple and generally normal to the associated pivot axis so that a user can resiliently deform the pawl to cause the pawl to retreat into the mounting to enable removal of the temple, each frame clip portion including a slot extending to the associated aperture, and each pawl includes a projection to pass along the associated slot to aid the user to manipulate the pawl to cause the retreat of the pawl to thereby enable withdrawal of the bayonet from within the socket.

2. The eyewear of claim 1, wherein each bayonet is insertable into the associated socket by movement in a predetermined direction generally parallel to the temple, and generally normal to the associated deflection axis and pivot axis.

3. The eyewear of claim 2, wherein each pawl has an abutment surface received within the associated aperture to engage the associated frame clip portion to secure the temple to the lens frame, each abutment surface facing in a direction opposite to said predetermined direction.

4. The eyewear of claim 3, wherein each abutment surface is removed from engagement with the associated frame clip portion when the pawl is retracted into the mounting.

5. The eyewear of claim 4, wherein each projection has a width transverse of the temple, and each abutment surface has a width transverse of said temple, the width of each projection being less than the width of its abutment surfaces.

6. The eyewear of claim 5, wherein each temple includes a longitudinal ridge slidably received within the associated slot to aid in rigid attachment of the temples to the mountings.

7. The eyewear of claim 6, wherein each frame clip portion is formed of metal and each temple clip portion is formed of resilient plastics material.

8. The eyewear of claim 7, wherein each temple clip portion includes ramp surfaces to deflect the pawl thereof to provide for insertion of the pawl into the respective socket.

* * * * *